Jan. 18, 1966 A. B. BLACKBURN 3,230,341
WELDING MACHINE
Filed Sept. 23, 1963 2 Sheets-Sheet 1
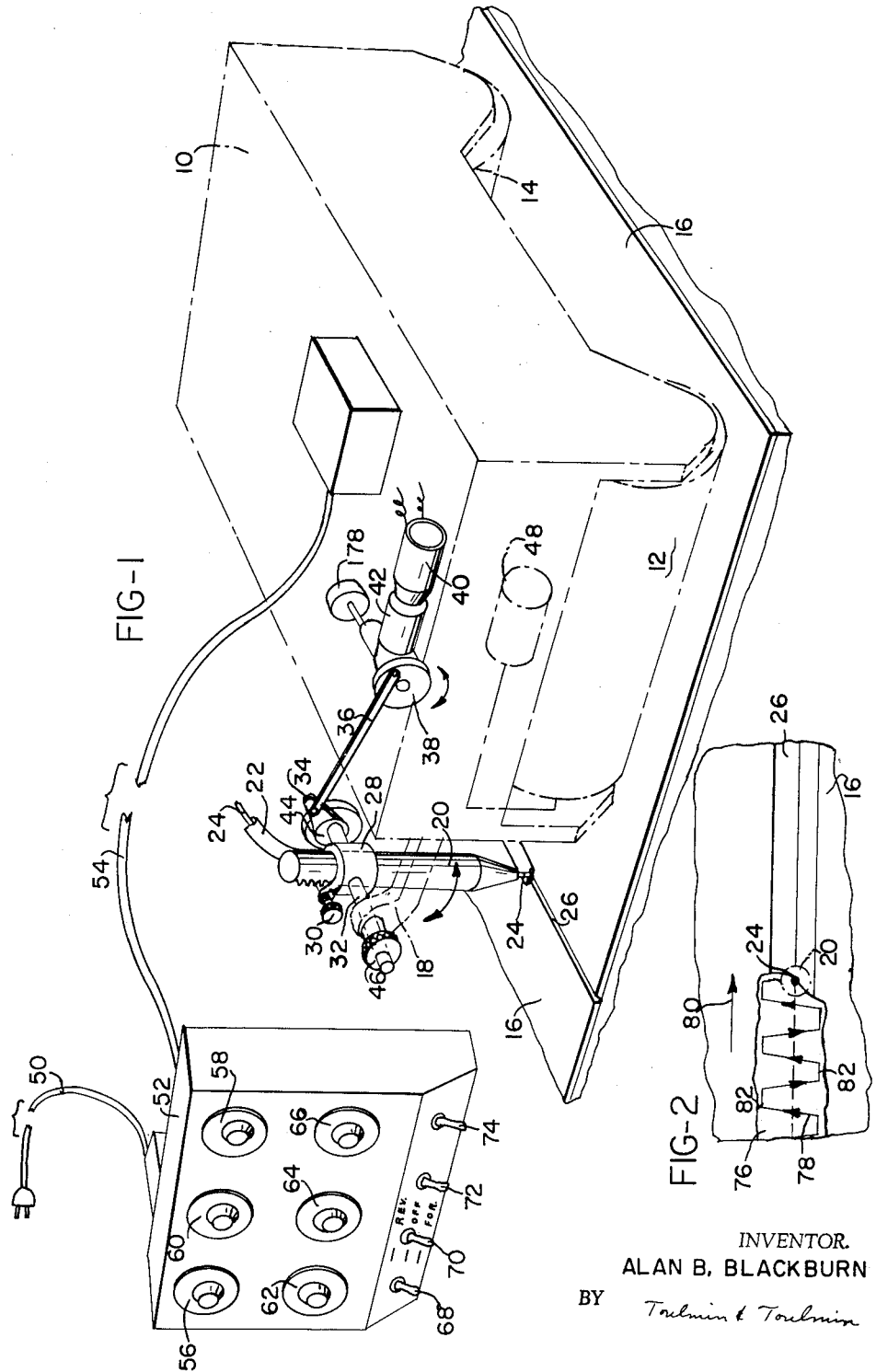
INVENTOR.
ALAN B. BLACKBURN
BY Toulmin & Toulmin
ATTORNEYS United States Patent Office 3,230,341
Patented Jan. 18, 1966

3,230,341
WELDING MACHINE
Alan B. Blackburn, Troy, Ohio, assignor to Hobart Brothers Company, Troy, Ohio, a corporation of Ohio
Filed Sept. 23, 1963, Ser. No. 310,714
14 Claims. (Cl. 219—125)

This invention relates to an electric control system and is particularly concerned with an electric control system for a motor which is connected to oscillate the nozzle structure in a carriage type welder.

A carriage type welder of the nature with which the present invention is concerned is disclosed in the co-pending Blankenbuehler application, Serial No. 311,582, filed September 25, 1963, and in general, comprises a weld mounted carriage in which the wheels are driven to cause the carriage to move over a work member. A seam to be welded in the work member is aligned with a nozzle mounted on the carriage and to which welding wire and weld current is supplied. As the carriage travels and the nozzle moves along the region to be welded, the nozzle is caused to oscillate so that the welding wire is carried back and forth over the region being welded and thus forms the proper type of weld and lays down the proper sort of bead to form the weld seam.

The present invention is particularly concerned with the control of an electric motor which is connected for effecting the oscillation of the nozzle structure.

Heretofore, the oscillation of the nozzle structure has been accomplished as in the application referred to above, by connecting an electric motor through adjustable linkage with the nozzle structure whereby the nozzle structure oscillated according to a fixed but adjustable pattern throughout the welding operation.

The arrangement referred to above has certain definite defects in connection with properly controlling the nozzle. In the first place, the carriage is often relatively inaccessible a portion of the time since it may be running up the side of a tank or a pipe or some other region where it cannot be easily reached by a workman. Under such circumstances, if the carriage travels slightly laterally, it may be that the welding nozzle will not have its oscillation centered over the seam and this could lead to a defective weld.

In other cases it can occur that the amount of oscillation of the nozzle is not in conformity with best welding practices and any adjustment of this condition is also substantially impossible with the welding carriage arrangement of the application referred to above.

Still further, the speed of oscillation of the nozzle is of importance in laying down the right sort of bead, and in the application mentioned above, any adjustment of this speed could only be accomplished directly in the carriage.

With the foregoing in mind, the present invention proposes the provision of a control circuit arrangement for the electric motor which oscillates the nozzle in a welding carriage of the nature referred to such that the adjustment of the operating characteristics of the motor can be made from a position remote from the welding carriage.

Another object of the present invention is the provision of a control circuit arrangement for controlling the speed of revolution of the nozzle oscillating motor of a welding carriage and the amount of lateral travel imparted thereby to the nozzle structure, and also adjusting the limits of the travel of the nozzle and effecting the foregoing by means of a somewhat remote control unit connected to the welding carriage by a flexible electric cable.

Still a further object of this invention is the provision of an arrangement for controlling the nozzle oscillating motor of a self-propelled welding carriage in which multiple and fine adjustments of all of the important operating characteristics of the nozzle adjusting motor can be quickly and easily controlled from a control station remote from the carriage.

Still a further object of this invention is the provision of an arrangement according to the foregoing object in which the control station is quite small so that it can easily be carried in the operator's hand, thereby permitting quick and convenient adjustment of the nozzle oscillating motor at any time.

These and other objects and advantages of this invention will become more apparent upon reference to the following specification taken in connection wtih the accompanying drawings, in which:

FIGURE 1 is a diagrammatic perspective view showing a welding carriage having an oscillating nozzle and a motor connected with the nozzle for oscillating it, and a remote control station connected with the motor in accordance with the present invention;

FIGURE 2 is a somewhat schematic view showing an example of the path that is taken by the wire being fed to the welding nozzle to a seam being welded.

Figure 3:
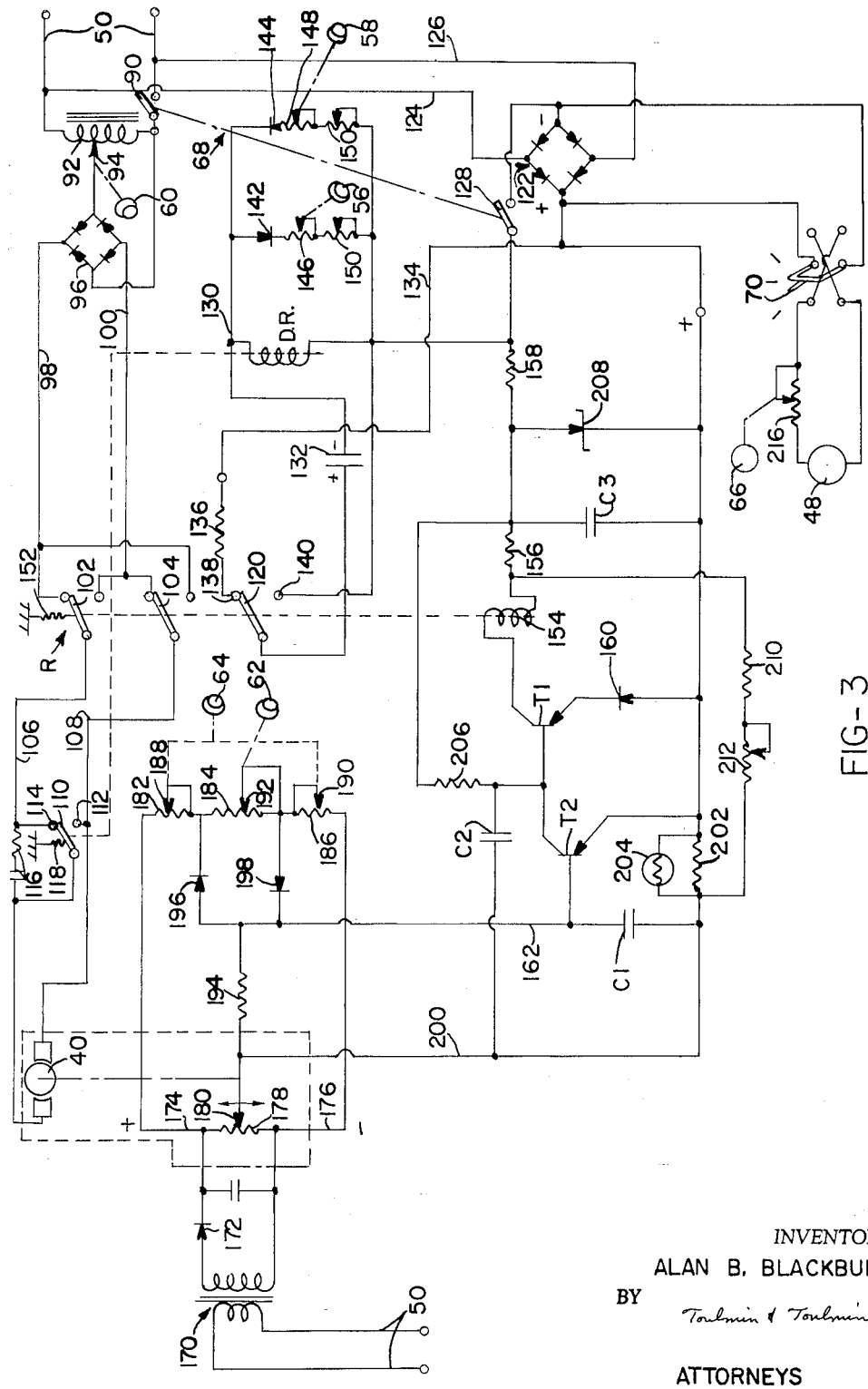
FIGURE 3 is a schematically illustrated electrical diagram of the control system of the present invention.

Referring to the drawings somewhat more in detail, in FIGURE 1 the travel carriage is indicated at 10 and it comprises wheels or rollers 12 and 14 preferably provided with an electromagnetic means holding the carriage on a magnetic work member 16. The carriage has supported thereon by bracket means 18 a welding nozzle structure 20 to which is connected a cable 22 through which welding wire 24 is fed to the seam 26 being welded. Gas and coolant can also be fed through the nozzle structure, and there is, of course, a suitable supply of welding current to accomplish the welding operation.

The nozzle structure is axially movable toward and away from the work in bracket 28 by means of adjusting knob 30 to obtain the proper spacing between the end of the nozzle structure and the workpiece being welded. Bracket 28 is oscillatably mounted as on shaft means 32 so that at least the lower end of the nozzle structure will swing back and forth over the seam to lay a bead thereon of the proper width. This shaft means is supported on the carriage 10 by the aforementioned bracket means 18.

For oscillating the nozzle structure a lever 34 is connected to shaft 32 and a drag link 36 leads from the end of lever 34 to the oscillatory output member 38 of an electric motor 40 connected through speed reducing means 42 with the said output member.

The nozzle structure is adapted for being adjusted manually about axis 32 by reason of a frictional or otherwise adjustable connection 44 between lever 34 and shaft 32, so that while shaft 32 will normally move with lever 44, the shaft can be turned independently of lever 34 by availing of knurled knob 46.

The wheels or rollers 12 and 14 supporting the carriage are driven by an electric motor 48, preferably through speed change gearing so that the carriage is caused to move on the workpiece being welded merely by a supply of energy to motor 48.

Power is supplied to the carriage by way of the lead in cable 50 which leads through a control box 52 which, in turn, is connected with the carriage via flexible electric cable means 54.

The control box, which is relatively small, includes a plurality of switches and controls that will be explained more fully hereinafter and which are employed for controlling the oscillating motor 40 and the carriage drive motor 48.

Referring to control box 52, rheostat 56 controls the dwell of the nozzle at one limit of its drive, and rheostat 58 controls the dwell of the nozzle at the other limit of its drive. The speed of the nozzle is under the control of an adjustable member 60, which takes the form of an auto transformer. Another rheostat 62 controls the width of the oscillatory path of the nozzle and a fourth rheostat at 64 controls the region of the oscillation so the nozzle can be centered over the weld seam. Still another adjustable member at 66 controls the speed of movement of the carriage and is connected to motor 48.

The control box also includes the on-off switches 68 for the oscillating motor 40, and a switch 70 for the carriage motor 48, and switches 72 and 74 for controlling the welder and the electromagnets for the carriage, respectively. Switch 70 is a combined on-off switch and a reversing switch and has three positions to accomplish its three functions.

As will be seen hereinafter, the control circuit includes transformer and rectifier means which would preferably be independent of control box 52 and which would be positioned between control box 52 and lead in cable 50. This will permit the control box to be made quite small since it would contain only resistors and the like and certain relays pertaining to the control circuit.

FIGURE 2 shows diagrammatically what is accomplished by the practice of the present invention. In FIGURE 2 the bead being laid down is indicated at 76, and this is laid down over and in joint 26 by causing the wire fed end of nozzle structure 20 to oscillate back and forth as represented by the line 78. It will be seen that, during continued travel of the carriage in the direction of line 80, the nozzle swings back and forth across the region to be welded with a dwell period at 82 at each end of its travel. It is in general connection with the lateral spacing between the dwell region 82, the duration of the dwell region 82, the speed of oscillation of the nozzle relative to the speed of the carriage, and the location of the center line between the dwell regions 82 that the present invention is particularly concerned.

Turning now to FIGURE 3, this shows diagrammatically the control circuit for the motors 40 and 48 with the circuit from the former being shown in the greatest detail. Motor 40 may be of any suitable reversing type, but it is preferred to use a permanent magnet D.C. motor because reversing thereof can be accomplished by reversing the direction of armature current and the dynamic braking thereof can be obtained by short circuiting the armature, while the speed can be limited by controlling the voltage supply.

In FIGURE 3 the voltage supply to motor 40 is from the lead in cable 50 which is connected through a blade 90 of an on-off switch with opposite ends of the auto transformer 92 having an adjustable tap 94. A full wave rectifier 96 is connected between tap 94 and one side of the auto transformer and supplies rectified D.C. current to the wires 98 and 100. Wires 98 and 100 are connected through a solenoid operated reversing switch generally designated R with the armature of motor 40. Reversing switch R has blades 102 and 104 connected directly with opposite sides of the armatures of motor 40 by wires 106 an 108, so that in one position of switch R motor 40 will run in one direction, and in the other position of switch R motor 40 will run in the opposite direction. The speed at which the motor will run is determined by the setting of adjustable tap 94, which is connected with the aforementioned adjustable member 60 of control box 52.

Means are provided for short circuiting the armature of motor 40, and this takes the form of a switch blade 110 located between wires 106 and 108, and having one position where it closes on contact 112, while the opposite sides of the armature are directly inter-connected to short the armature and thereby halt the motor. Blade 110 has a second position where it closes on contact 114 wherein the wires 106 and 108 are not inter-connected and the motor will run. Specific arresting capacitor and resistor means 116 are included in the circuit in association with switch blade 110 to inhibit sparking at the contact points.

Blade 110 is normally held in engagement with contact element 114 by spring 118 and is movable into engagement with contact element 112 by energization of the dwell relay coil D.R.

Energization of the coil of dwell relay D.R. is under the control of a third blade 120 of reversing switch R. This blade in turn has electric power supplied thereto from a second full wave rectifier 122 also connected with cable 50, which is the same as the previously mentioned cable 50, by wires 124 and 126. The negative side of rectifier bridge 122 is connected through second blade 128 of the on-off switch which also comprises blade 90 with one end of the coil of the dwell relay D.R., whereas the other end of this coil is connected by wire 130 with one side of the capacitor 132, the other side of which is connected with the aforementioned blade 120.

The positive side of rectifier bridge 122 is connected by wire 134 with one end of a resistor 136, the other end of which is connected with the upper contact element 138 pertaining to blade 120.

The lower contact element 140 pertaining to blade 120 is also connected with the negative side of the rectifier bridge and also to the end of coil D.R. opposite its connection with capacitor 132.

When blade 120 is first closed on contact element 138, current will flow in the circuit to coil D.R. and through capacitor 132 until the latter is charged up, and at which time the current will cease. But during this period sufficient current flows through coil D.R. to actuate blade 110 into its lower armature shorting position.

When blade 120 closes on contact element 140, condenser 132 discharges through blade 120 and then through coil D.R., and again energizes this coil to move blade 110 into its armature shorting position until the capacitor is discharged to a predetermined degree. It will be seen that as blade 120 moves, coil D.R. will be de-energized for a predetermined period of time, thereby to short out the armature of motor 40 and bring this motor to a halt. Inasmuch as blade 120 forms a part of the reversing switch, it will be evident that this dwell period will occur each time motor 40 is reversed, and this will lead to the aforementioned flat parts 82 referred to in connection with FIGURE 2.

The period of the dwell accomplished in the foregoing manner is adjustable by means of two resistance branches connected in parallel with coil D.R. One resistance branch controls the dwell of the nozzle at one end of its travel and the other resistance branch controls the dwell of the nozzle at the other end of its travel. These branches are made so as selectively to control in this manner by including therein the diodes 142 and 144, the first of which will conduct while condenser 132 is being charged, and the second of which will conduct when condenser 132 is being discharged. In series with the aforementioned respective diodes are the resistor 146 which is connected with the aforementioned knob 56 of the control panel and the adjustable resistor 148 connected with the knob 58 of the control panel. Each adjustable resistor preferably has in series therewith a fourth adjustable resistor, such as at 150 for making preliminary adjustments in the circuit.

Resistors 146 and 148 are independently adjustable and can provide for different amounts of dwell on opposite sides of the seam, which might be necessary if the metal on one side of the seam was thicker than that on the other side. The arc will be held longer on the thick metal than on the thin metal.

The circuitry described up to this point provides for variable speed operation of motor 40 by adjustment of the auto transformer and reversing of the motor 40 in accordance with the movement of reversing switch R, and a variable dwell of motor 40 at each point of the reversing thereof.

With regard to the operation of reversing switch R, this is accomplished automatically in accordance with the position of motor 40. The reversing switch R is biased toward one position by a spring 152 and is adapted for being moved to its other position by energization of the coil 154 associated with the reversing switch.

Coil 154 has one end connected through resistors 156 and 158 and through aforementioned blade 128 with the negative side of rectifier bridge 122.

The other side of coil 154 is connected with the collector of a first transistor T1, the emitter of which is connected through diode 160 with the positive side of rectifier bridge 122.

The base of transistor T1 is connected with the collector of a second transistor T2, the emitter of which is connected with the positive side of rectifier bridge 122. The base of transistor T2 is connected with a wire 162 which leads to a circuit that is partially under the control of motor 40.

This last mentioned circuit comprises a step-down transformer 170 the primary side of which is connected with cable 50, and the secondary side of which supplies direct current through a simple rectifier-filter arrangement 172 to wires 174 and 176, the former being positive and the latter being negative. Connected between these wires is a feedback rheostat 178 having a movable contact 180 connected with motor 40, so that as motor 40 runs in one direction, contact 180 will move along the rheostat in one direction and when the motor 40 moves in the other direction, this contact point will move in the opposite direction.

Also connected between wires 174 and 176 are the serially arranged rheostats 182, 184 and 186. Rheostats 182 and 186 have movable taps 188 and 190 respectively which are connected for simultaneous adjustment, and which are connected to the adjusting knob 64 of the control panel. Rheostat 184, on the other hand, has an adjustable tap 192 which is connected for movement by the adjustable knob 62 of the control panel.

The adjustable tap 180 of resistor or rheostat 178, is connected through a resistor 194 with one side of diode 196, the other side of which is connected to adjustable tap 188 of rheostat 182. This same end of resistor 194 is also connected to one side of diode 198 which is reversed with respect to diode 196 and with the other side of diode 198 being connected to tap 190 of rheostat 186. This same end of resistor 194 is connected to the aforementioned wire 162.

The other end of resistor 194 that is connected to tap 180 is also connected to a wire 200 which is connected through resistor 202 with the positive side of rectifier bridge 122. This last mentioned resistor is arranged in parallel with a negative temperature co-efficient resistor 204 which serves to stabilize the amplifier.

The condenser C1 is connected between wires 162 and 200 and another condenser C2 is connected between wire 200 and the collector side of transistor T2. The collector side of transistor T2 is also connected through a resistor 206 with a point between resistors 156 and 158 disposed between the negative side of rectifier bridge 122 and coil 154.

A still further condenser C3 is connected between this last mentioned point and the positive side of rectifier bridge 122 and in parallel with this condenser is a zener diode 208.

A still further resistance branch circuit is provided leading from a point between coil 154 and resistor 156 to wire 200, and this branch includes a fixed resistor 210 and the rheostat 212.

Energization of coil 154 will pull blades 102, 104 and 120 associated therewith downwardly, whereas de-energization of reversing relays will permit the aforementioned spring 152 to move the blades upwardly.

The aforementioned carriage drive motor 48 will be seen in FIGURE 3 to be connected across the direct current output terminal of bridge 122 through the on-off and reversing switch 70 of control panel 52, and a speed control rheostat 216, the adjustable tap of which is connected with adjusting member 66 of the control panel.

The operation of the reversing relay is accomplished in the following manner: If motor 40 is moving in a direction to cause tap 180 of rheostat 178 to move upwardly on the rheostat, the said tap will be moving toward a region of higher voltage, and when this voltage exceeds the voltage on the negative side of diode 196, current will flow through resistor 194, which will tend to make wire 162 negative with respect to wire 200.

Wire 162 being made negative relative to wire 200 will cause transistor T2 to conduct consequently cutting off transistor T1 and de-energizing reversing relay coil 154. A positive feed-back is provided from resistor 156 through resistors 210 and 212 to insure completion of the act of de-energizing or energizing relay coil 154.

De-energization of relay 122 will shift the blades of the reversing relay and, as explained before, will cause first, a dwell period of motor 40, and thereafter the reversing of motor 40. At this time tap 180 is driven by motor 40 toward a region of more negative potential, and when the tap reaches a point where its potential is more negative than the positive side of diode 198, current will again flow through resistor 194 but in a direction opposite to what occurred before.

Wire 162 will now be made positive with respect to wire 200, and will cause cut off of transistor T2 allowing transistor T1 to be made conductive, by base current supplied through resistor 206, and bring about energization of reversing relay coil 154, which as before, will be accomplished by a halting of motor 40 for a dwell period and then reversing of the motor to move the nozzle in the opposite direction.

The amount of travel of the nozzle between the flat portions 82, namely, the width of the oscillation pattern, is under the control of rheostat 184, whereas the location of the center line of the oscillatory pattern is under the control of the rheostats 182 and 186 which are arranged for a simultaneous adjustment so that when they are adjusted, they do not change the total resistance of the branch in which they are located.

The complete control of motor 40 as to its speed and the points of reversal thereof and the duration of the dwell periods, and the adjustment of the center line of the oscillatory pattern imparted thereby to the nozzle is thus relatively easily accomplished by the circuit described above. The circuit is of such a nature that the adjustable components can be embodied in control panel 52 and easily carried about by the machine operator, whereas larger and heavier components such as transformers and rectifiers and the like, and including at least some of the relays, can be arranged independent of the control panel so that the control panel is not made large and heavy thereby.

The provision of the control arrangment according to the present invention makes it quite simple to effect complete and accurate control of the carriage and from a point remote from the carriage so the carriage can be caused to travel along vertical and overhead surfaces and around large links and pipes, and by observing the operation of the welding carriage in laying the bead on the joint to be welded, all necessary adjustments can be made from the remote control station carried by the operator to insure that a proper job is done.

It will be understood that this invention is susceptible to modifications in order to adapt it to different usages and conditions; and accordingly, it is desired to comprehend such modifications within this invention as may fall within the scope of the appended claims.

I claim:
1. A welding control system for causing a nozzle structure containing welding wire to oscillate over a region being welded comprising, a motor attached to said nozzle, an energizing circuit connected to the motor, reversing switch means in the energizing circuit operable for reversing the motor, means for de-energizing said motor for an adjustable predetermined period of time each time the motor is reversed to cause the nozzle to dwell, and means operated by the motor controlling said reversing switch.

2. A welding control system for causing a nozzle structure containing welding wire to oscillate over a region being welded comprising, a motor attached to said nozzle, an energizing circuit connected to the motor, reversing switch means in the energizing circuit operable for reversing the motor and said nozzle, means responsive to movement of the reversing switch from each position thereof to the other for de-energizing said motor for an adjustable predetermined period of time, and control means responsive to a predetermined travel of the motor in each direction for operating said reversing switch.

3. A welding control system for causing a nozzle structure containing welding wire to oscillate over a region being welded comprising, a motor attached to said nozzle, an energizing circuit connected to the motor, reversing switch means in the energizing circuit operable for reversing the motor and said nozzle, means responsive to movement of the reversing switch from each position thereof to the other for de-energizing said motor for an adjustable predetermined period of time, and control means responsive to a predetermined travel of the motor in each direction for operating said reversing switch, said control means including means adjustable to vary the amount of said predetermined travel.

4. A welding control system for causing a nozzle structure containing welding wire to oscillate over a region being welded comprising, a motor attached to said nozzle, an energizing circuit connected to the motor, reversing switch means in the energizing circuit operable for reversing the motor and said nozzle, means responsive to movement of the reversing switch from each position thereof to the other for de-energizing said motor for an adjustable predetermined period of time, and control means responsive to a predetermined travel of the motor in each direction for operating said reversing switch, said control means including means adjustable to vary the amount of said predetermined travel, said control means also including means for adjusting both points of reversal of said motor without changing the amount of said predetermined travel.

5. A welding control system for causing a nozzle structure containing welding wire to oscillate over a region being welded comprising, a motor attached to said nozzle, an energizing circuit connected to the motor, reversing switch means in the energizing circuit having one position for one direction of travel of said motor and a second position for the opposite direction of travel of said motor, delay means in the energizing circuit operable for interrupting the energizing circuit for an adjustable predetermined period of time to cause the motor and said nozzle to dwell, means responsive to movement of the reversing switch from either said position thereof to the other for actuating said delay means, and control means responsive to a predetermined travel of the motor in each direction for operating said reversing switch.

6. A welding control system for causing a nozzle structure containing welding wire to oscillate over a region being welded comprising, a motor attached to said nozzle, an energizing circuit connected to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor and said nozzle to dwell, means for adjusting said predetermined period of time, means responsive to movement of the reversing switch from either said position thereof to the other for actuating said delay means, and control means responsive to a predetermined travel of the motor in each direction for operating said reversing switch.

7. A welding control system for causing a nozzle structure containing welding wire to oscillate over a region being welded comprising, a motor attached to said nozzle, an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for an adjustable predetermined period of time to cause the motor and said nozzle to dwell, means responsive to movement of the reversing switch from either said position thereof to the other for actuating said delay means, and control means responsive to a predetermined travel of the motor in each direction for operating said reversing switch.

8. In a motor control system; an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch, said delay means including adjustable means operable for independently adjusting the dwell period at each point of reversal of said motor.

9. In a motor control system; an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch, said delay means being adjustable to change said period of time, and said control means including means selectively adjustable for changing the amount of said predetermined travel and for changing the points of reversal of the motor without changing the amount of said predetermined travel.

10. In a welding carriage; a wheel supported frame, a welding nozzle structure movably mounted on the frame for oscillatory movement thereof in a direction substantially transverse to the direction of movement of the carriage, a motor in the frame operatively connected to said nozzle structure for effecting the said oscillation thereof, and a control system for said motor comprising an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch.

11. In a welding carriage; a wheel supported frame, a welding nozzle structure movably mounted on the frame for oscillatory movement thereof in a direction substantially transverse to the direction of movement of the carriage, a motor in the frame operatively connected to said structure for effecting the said oscillation thereof, and a control system for said motor comprising an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch, said delay means including means for dynamically braking said motor at each point of reversal thereof.

12. In a welding carriage; a wheel supported frame, a welding nozzle structure movably mounted on the frame for oscillatory movement thereof in a direction substantially transverse to the direction of movement of the carriage, a motor in the frame operatively connected to said nozzle structure for effecting the said oscillation thereof, and a control system for said motor comprising an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch, said delay means including means for dynamically braking said motor at each point of reversal thereof, and means for adjusting the respective dwell periods at each point of reversal of the motor.

13. In a welding carriage; a wheel supported frame, a welding nozzle structure movably mounted on the frame for oscillatory movement thereof in a direction substantially transverse to the direction of movement of the carriage, a motor in the frame operatively connected to said nozzle structure for effecting the said oscillation thereof, and a control system for said motor comprising an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch, first means for adjusting said voltage source, second means for adjusting said delay means, third means for adjusting the amount of said predetermined travel, fourth means for adjusting the points of reversal of the motor without changing tthe amount of said predetermined travel, a remote control station connected to said carriage by flexible cable means, and said first, second, third and fourth means being in said remote control station.

14. In a welding carriage; a wheel supported frame, a welding nozzle structure movably mounted on the frame for oscillatory movement thereof in a direction substantially transverse to the direction of movement of the carriage, a motor in the frame operatively connected to said nozzle structure for effecting the said oscillation thereof, and a control system for said motor comprising an energizing circuit connected to the motor, a variable voltage source connected to said energizing circuit for supplying power to the motor, reversing switch means in the energizing circuit having one position for one direction of travel of said motor and a second position for the opposite direction of travel of said motor, delay means in the energizing circuit operable for interrupting the energizing circuit for a predetermined period of time to cause the motor to dwell, means responsive to movement of the reversing switch from either said position thereof to the other for actuating said delay means, and control means responsive to a predetermined travel of the motor in each direction for operating said reversing switch, first means for adjusting said voltage source, second means for adjusting said delay means, third means for adjusting the amount of said predetermined travel, fourth means for adjusting the points of reversal of the motor without changing the amount of said predetermined travel, a remote control station connected to said carriage by flexible cable means, and said first, second, third and fourth means being in said remote control station, said frame having a second motor connected to the carriage wheels, and control means for said second motor also located in said remote control station.

References Cited by the Examiner

UNITED STATES PATENTS

| | | | |
|---|---|---|---|
| 2,458,175 | 1/1949 | Kolding | 318—282 X |
| 2,472,803 | 6/1949 | Beyer et al. | 219—125 |
| 2,677,797 | 5/1954 | Sher et al. | 318—282 |
| 3,008,074 | 11/1961 | Gregory | 318—285 X |
| 3,035,156 | 5/1962 | Staley | 219—125 |
| 3,179,781 | 4/1965 | Ross et al. | 314—39 X |

FOREIGN PATENTS 513,083   5/1955   Canada.

ANTHONY BARTIS, *Acting Primary Examiner.*
JOSEPH V. TRUHE, *Examiner.*